United States Patent Office 3,153,045
Patented Oct. 13, 1964

3,153,045
PROCESS FOR THE SIMULTANEOUS PREPARA-
TION OF 2-BROMOPYRIDINE AND 2-CHLORO-
PYRIDINE
Robert M. Thomas, Pittsford, N.Y., assignor to Olin
Mathieson Chemical Corporation, a corporation of
Virginia
No Drawing. Filed Jan. 28, 1963, Ser. No. 254,492
10 Claims. (Cl. 260—290)

This invention relates to the preparation of 2-bromo-pyridine. More particularly this invention relates to a process for the simultaneous preparation of 2-bromo-pyridine and 2-chloropyridine.

2-halopyridines, such as 2-bromopyridine and 2-chloro-pyridine are useful as intermediates in the preparation of fungicides, bacteriostatics and the like.

Numerous techniques are available in the art for the preparation of 2-bromopyridine. In one process, bromine is reacted directly with pyridine at a temperature of about 500° C. to form 2-bromopyridine and hydrogen bromide. Disadvantages of this process include the high temperature requirements, the unsatisfactory product yield, and the loss of half of the expensive bromine reactant as hydrogen bromide.

High yields of 2-chloropyridine have been obtained by reacting chlorine and pyridine in the gaseous phase, employing carbon tetrachloride as a diluent during the reaction. Although this technique is very effective in the reaction between chlorine and pyridine, the economics of using bromine to prepare 2-bromopyridine by this technique are not entirely statisfactory due to the consumption of expensive bromine to form hydrogen bromide as a reaction product.

It is a primary object of this invention to provide an improved process for preparing 2-bromopyridine which overcomes disadvantages of prior art processes.

Another object of the invention is to provide a process for preparing 2-bromopyridine in which substantially all of the bromine reactant is converted to 2-bromopyridine.

Still another object of the invention is to provide a process for preparing simultaneously 2-bromopyridine and 2-chloropyridine.

These and other objects of the invention will be apparent from the following detailed description thereof.

A further object of this invention is to provide a process for preparing 2-bromopyridine at reduced temperatures.

It has now been discovered that markedly improved conversion of bromine to 2-bromopyridine is obtained when a halogen reaction mixture of bromine and chlorine is reacted with pyridine in a gaseous phase in the presence of gaseous carbon tetrachloride. The gaseous reaction product is condensed and 2-bromopyridine and 2-chloropyridine are recovered therefrom. In the process of this invention, bromine reacts with pyridine to form 2-bromopyridine and hydrogen bromide. A major portion of the chlorine in the halogen reaction mixture reacts with hydrogen bromide to form hydrogen chloride and bromine. The bromine thus formed reacts with additional pyridine. As a result a major proportion of the bromine yields 2-bromopyridine while a major proportion of the chlorine in the halogen reaction mixture yields hydrogen chloride. Another advantage of the process of this invention is that the reaction may be carried out at temperatures substantially below about 500° C. if desired.

The bromine and chlorine reactants in the halogen reaction mixture of this invention may be admixed by any one of several embodiments. In one embodiment, bromine and carbon tetrachloride are admixed to form a bromine solution, chlorine is bubbled through carbon tetrachloride to form a chlorine solution, and the two solutions are admixed and then fed to the reaction zone. In another embodiment the bromine solution and chlorine solution thus prepared are separately fed to the reaction zone. In still another embodiment, chlorine is bubbled through a solution of bromine in carbon tetrachloride. The molar ratio of bromine to chlorine in the halogen reaction mixture is preferably between about 0.7:1 and about 1.5:1, but greater or lesser ratios may be employed if desired. For example, the molar ratio of chlorine to bromine may be as low as 0.5:1 or as high as 100:1.

The term "halogen reaction mixture," as used throughout the description and claims includes the mixture of bromine and chlorine reaching the reaction zone, but does not include the chloride component of carbon tetrachloride, which is substantially inert in the reaction.

The molar ratio of carbon tetrachloride to the halogen mixture of bromine and chlorine is generally between about 0.5:1 and about 5:1, and preferably between about 1:1 and about 2.5:1.

Sufficient pyridine is employed in the reaction to provide a molar ratio of pyridine to total moles bromine and chlorine in the halogen reaction mixture of between about 1:1 and about 5:1, and preferably between about 2.5:1 and about 4.5:1. When the molar ratio of pyridine to halogen is less than about 1:1, the yield of 2-bromopyridine may be reduced. When the ratio is increased above about 5:1, the yield of 2-bromopyridine is not substantially affected, but larger equipment is required to handle the excess pyridine, which adds significantly to the product cost.

In carrying out the reaction it is preferred to employ a reactor through which gaseous pyridine and the gaseous mixture of bromine, chlorine and carbon tetrachloride are passed in concurrent flow. If desired, the reactor may be packed with any suitable material that is inert with respect to the reactants and product. For example, glass beads, ceramic, and the like may be employed. The residence time of the reactants in the reactor should be maintained as low as possible in order to inhibit flashing, carbonization, and formation of tarry by-products. Generally a residence time of between about 0.8 and about 4 seconds is sufficient to effect the desired degree of reaction.

Reaction temperatures in the range of between about 325 and about 475° C., and preferably between about 375 and 450° C., are employed. When the reaction temperature is below about 325° C., the rate of reaction is reduced. When the temperature is in excess of about 475° C., there is a tendency for the carbon tetrachloride diluent to break down.

The gaseous reaction product discharged from the reaction zone is condensed by cooling, for example in a water-cooled condenser, or by spraying water or other aqueous medium onto the gaseous reaction product. In one embodiment the gaseous reaction product is condensed in a water-cooled condenser and the resulting liquid is admixed with an aqueous sodium hydroxide solution to adjust the pH to about 9. The resulting basic solution is then extracted with several portions of carbon tetrachloride, each portion being about equal to the volume of the organic layer of the neutralized product. The combined organic layers are then steamed distilled until no organic layer appears in the steam distillate. Sodium chloride is then added to the two phase steam distillate to form an aqueous brine solution containing about 15 percent sodium chloride. The brine is then agitated and the lower organic layer is separated and distilled at atmospheric pressure to separate carbon tetrachloride, which may be recycled to the reactor. Subsequent fractional distillation yields a pyridine fraction, a 2-chloropyridine fraction and a 2-bromopyridine fraction. The pyridine may be recycled to the reactor and the 2-chloropyridine fraction and the 2-bromopyridine fraction are separately collected for use in the preparation of insecticides, bacteriostatics, and the like.

The following examples are presented without any intention of being limited thereby. All parts and percentages are by weight unless otherwise specified.

EXAMPLES 1-7

The same general apparatus was employed in each of these examples except for certain modifications which are discussed below. The apparatus included a vessel for liquid pyridine, the vessel having a discharge line positioned in the bottom thereof. The discharge line communicated with a preheater line comprised of a coiled section of glass tubing positioned in a sodium nitrite-sodium nitrate bath maintained at about 400° C. The preheater line conveyed gaseous pyridine formed in the preheater to the inside of a tubular glass reactor having an internal reaction zone 12 inches in length, with a volume of about 138 milliliters.

Another vessel was provided for preparing the bromine solution, wherein bromine and carbon tetrachloride are admixed. In Examples 1, 2, and 3, gaseous chlorine was bubbled into a mixture of carbon tetrachloride and bromine through a calibrated rotameter at a rate sufficient to give the desired bromine to chlorine molar ratio. In Examples 4, 5, and 6, a solution of chlorine in carbon tetrachloride was prepared separately by bubbling chlorine through carbon tetrachloride and the resulting carbon tetrachloride-chlorine solution was admixed with the bromide-carbon tetrachloride solution. In all of the examples the chlorine-bromine-carbon tetrachloride solution was passed through a preheater coil in the sodium nitrite-sodium nitrate bath maintained at about 400° C., and the resulting gaseous mixture of bromine, chlorine and carbon tetrachloride was then conveyed to the interior of the reactor by means of a bayonet-type sparging tube 6 inches in length. The reactor tube was provided with a thermowell in which a thermocouple was positioned to measure the temperature of the reactor. The preheater lines were wrapped with glass electrical heating tape and then insulated, in order to maintain the temperatures of the gases being conveyed to the reactor at a temperature close to the reaction temperature. The unpacked glass reactor was also wrapped with glass electrical heating tape and insulated.

The pyridine flow was started through the preheater and the resulting gas was used to purge the reactor. The gaseous mixture of bromine, chlorine and carbon tetrachloride was then fed to the reactor in the proportion and at the rate indicated in the table below. In each example the reaction was continued for a period of 60 to 90 minutes. At the end of each period, the pyridine flow was continued for several minutes to remove traces of halogen in the reactor.

As each reaction progressed the gaseous reaction products were conveyed to a water-cooled condenser attached to a flask containing water cooled to about 0° C. The resulting solution was admixed with a 20 percent aqueous sodium hydroxide solution until the pH reached 9, and the resulting solution was then extracted with two volumes of carbon tetrachloride, each volume being equal to the volume of the organic layer of the pH-adjusted solution. The combined organic layers were then steam distilled until no organic layer appeared in the steam distillate. In addition to the steam distilled organic layer, about one-half to one liter of water was also collected. Sufficient sodium chloride was then added to the two phase steam distillate to form a 15 percent brine. These ingredients were agitated, and the lower organic layer was separated by decanting the upper aqueous layer. The organic layer was dried over magnesium sulfate. Distillation of the organic layer was then effected. At atmospheric pressure a carbon tetrachloride fraction was collected at 76–77° C., and a pyridine fraction was collected at 115.3° C. The residual liquid was then distilled at 50 millimeters of mercury. A fraction containing the remainder of the unreacted pyridine was collected at 43° C. at this pressure, then a fraction predominating in 2-chloropyridine was collected at 85° C., and 2-bromopyridine was collected at 99° C. The carbon tetrachloride was available for recycle.

The following table presents the reactants, the reaction conditions, the products, and conditions obtained in Examples 1–7.

Table 1
VAPOR PHASE BROMINATION OF PYRIDINE WITH BROMINE CHLORIDE

| Example | Bromine (moles) | Chlorine (moles) | (Py) Pyridine (moles) | Molar Ratio $Cl_2/Br_2$ | Molar Ratio Py/combined Halogen | Molar Ratio $CCl_4$/combined Halogen | Residence Time (sec.) | Reaction Temp. (°C.) | Percent Pyridine Conversion Found | Percent Pyridine Conversion Theoretical | Yield 2-BrPy (moles) | Yield[1] 2-BrPy Percent | Yield 2-ClPy (moles) | Yield[1] 2-ClPy Percent |
|---|---|---|---|---|---|---|---|---|---|---|---|---|---|---|
| 1 | 0.78 | 0.95 | 5.80 | 1.2 | 3.4 | 2 | 0.9 | 375–400 | 18 | 29 | 0.72 | 69 | 0.17 | 16 |
| 2 | 0.40 | 0.41 | 3.23 | 1.0 | 4.0 | 2 | 3.0 | 375–400 | 20 | 25 | 0.36 | 55 | 0.13 | 20 |
| 3 | 0.88 | 0.97 | 5.76 | 1.1 | 3.1 | 2 | 0.9 | 450 | 27 | 32 | 1.37 | 88 | 0.39 | 25 |
| 4 | 0.46 | 0.46 | 3.34 | 1.0 | 3.6 | 2 | 1.6 | 450 | 22 | 28 | 0.58 | 79 | 0.19 | 26 |
| 5 | 0.37 | 0.37 | 3.04 | 0.8 | 3.7 | 2 | 1.5 | 450 | 19 | 27 | 0.57 | 93 | 0.12 | 19 |
| 6 | 0.35 | 0.35 | 2.28 | 1.0 | 3.3 | 2 | 2.9 | 450 | 26 | 30 | 0.39 | 66 | 0.12 | 18 |
| 7 | 0.02 | 1.9 | 5.75 | 95.0 | 2.9 | 2 | 1.5 | 375–400 | 33 | 35 | 0.022 | 1 | 1.46 | 76.5 |

[1] Based on total pyridine consumed.

Various modifications of the invention are possible, some of which have been referred to above, without departing from the spirit and scope of this invention. Therefore I do not wish to be limited except as set forth in the appended claims.

I claim:

1. The process for preparing 2-bromopyridine which comprises admixing vapors of bromine, chlorine, carbon tetrachloride and pyridine at a temperature between about 325 and about 475° C. and recovering 2-bromopyridine from the reaction product.

2. The process of claim 1 wherein the temperature is between about 375 and 450° C.

3. The process for preparing 2-bromopyridine and 2-chloropyridine which comprises reacting a gaseous mixture of bromine and chlorine in gaseous carbon tetrachloride, with gaseous pyridine, and recovering 2-bromopyridine and 2-chloropyridine separately from the reaction product.

4. The process for preparing 2-bromopyridine and 2-chloropyridine which comprises preparing a gaseous mixture of bromine, chlorine, and carbon tetrachloride, reacting said gaseous mixture with gaseous pyridine at a temperature between about 325 and about 475° C., thereby yielding a gaseous reaction product, condensing said gaseous reaction product to yield an organic phase containing 2-bromopyridine and 2-chloropyridine, and distilling said organic phase to yield a fraction predominating in 2-bromopyridine and a fraction predominating in 2-chloropyridine.

5. The process for preparing 2-bromopyridine and 2-chloropyridine which comprises preparing a gaseous mixture of carbon tetrachloride and a halogen reaction mixture of bromine and chlorine, reacting said gaseous mixture with gaseous pyridine at a temperature between about 375 and about 450° C., thereby yielding a gaseous reaction product, contacting said gaseous reaction product with an aqueous medium to effect condensation of the reaction product, whereby the condensed reaction product separates into an organic phase and an aqueous phase, and separately recovering 2-bromopyridine and 2-chloropyridine from the organic phase.

6. The process of claim 5 wherein the molar ratio of chlorine to bromine in said halogen reaction mixture is between about 0.5:1 and about 100:1.

7. The process of claim 5 wherein the molar ratio of carbon tetrachloride to the total moles of bromine and chlorine in said halogen reaction mixture is between about 0.5:1 and about 5:1.

8. The process of claim 5 wherein the molar ratio of pyridine to the total moles of bromine and chlorine in said halogen reaction mixture is between about 1:1 and about 5:1.

9. The process for preparing 2-bromopyridine and 2-chloropyridine which comprises preparing a gaseous mixture of carbon tetrachloride and a halogen reaction mixture of bromine and chlorine, the molar ratio of chlorine to bromine in said halogen reaction mixture being between about 0.5:1 and about 100:1, the molar ratio of carbon tetrachloride to the total moles of bromine and chlorine in said halogen reaction mixture is between about 0.5:1 and about 5:1, reacting said gaseous mixture with gaseous pyridine in a proportion equivalent to a molar ratio of pyridine to total moles of gaseous bromine and gaseous chlorine in said halogen reaction mixture of between about 1:1 and about 5:1 at a temperature of between about 325 and about 475° C., thereby yielding a gaseous reaction product, contacting said gaseous reaction produce with an aqueous medium to effect condensation of the reaction product, whereby the condensed reaction product separates into an organic phase and an aqueous phase, and separately recovering 2-bromopyridine and 2-chloropyridine from the organic phase.

10. The process of claim 9 wherein the molar ratio of bromine to chlorine in said halogen reaction mixture is between about 0.7:1 and about 1.5:1, the molar ratio of carbon terachloride to the total moles of bromine and chlorine in said halogen reaction mixture is between about 1:1 and about 2.5:1, the molar ratio of pyridine to the total moles of bromine and chlorine in said halogen reaction mixture in said gaseous mixture is between about 2.5:1 and about 4.5:1, and the reaction temperature is between about 375 and about 450° C.

References Cited in the file of this patent
UNITED STATES PATENTS

| | | |
|---|---|---|
| 1,977,662 | Hibaut et al. | Oct. 23, 1934 |
| 2,480,091 | Taylor | Aug. 23, 1949 |
| 2,820,791 | Shermer | Jan. 21, 1958 |
| 2,839,534 | Shrader et al. | June 17, 1958 |

UNITED STATES PATENT OFFICE
CERTIFICATE OF CORRECTION

Patent No. 3,153,045            October 13, 1964

Robert M. Thomas

It is hereby certified that error appears in the above numbered patent requiring correction and that the said Letters Patent should read as corrected below.

Column 6, line 11, for "produce" read -- product --; line 19, for "terachloride" read -- tetrachloride --.

Signed and sealed this 26th day of January 1965.

(SEAL)
Attest:

ERNEST W. SWIDER            EDWARD J. BRENNER
Attesting Officer            Commissioner of Patents